United States Patent Office 3,717,037
Patented Feb. 20, 1973

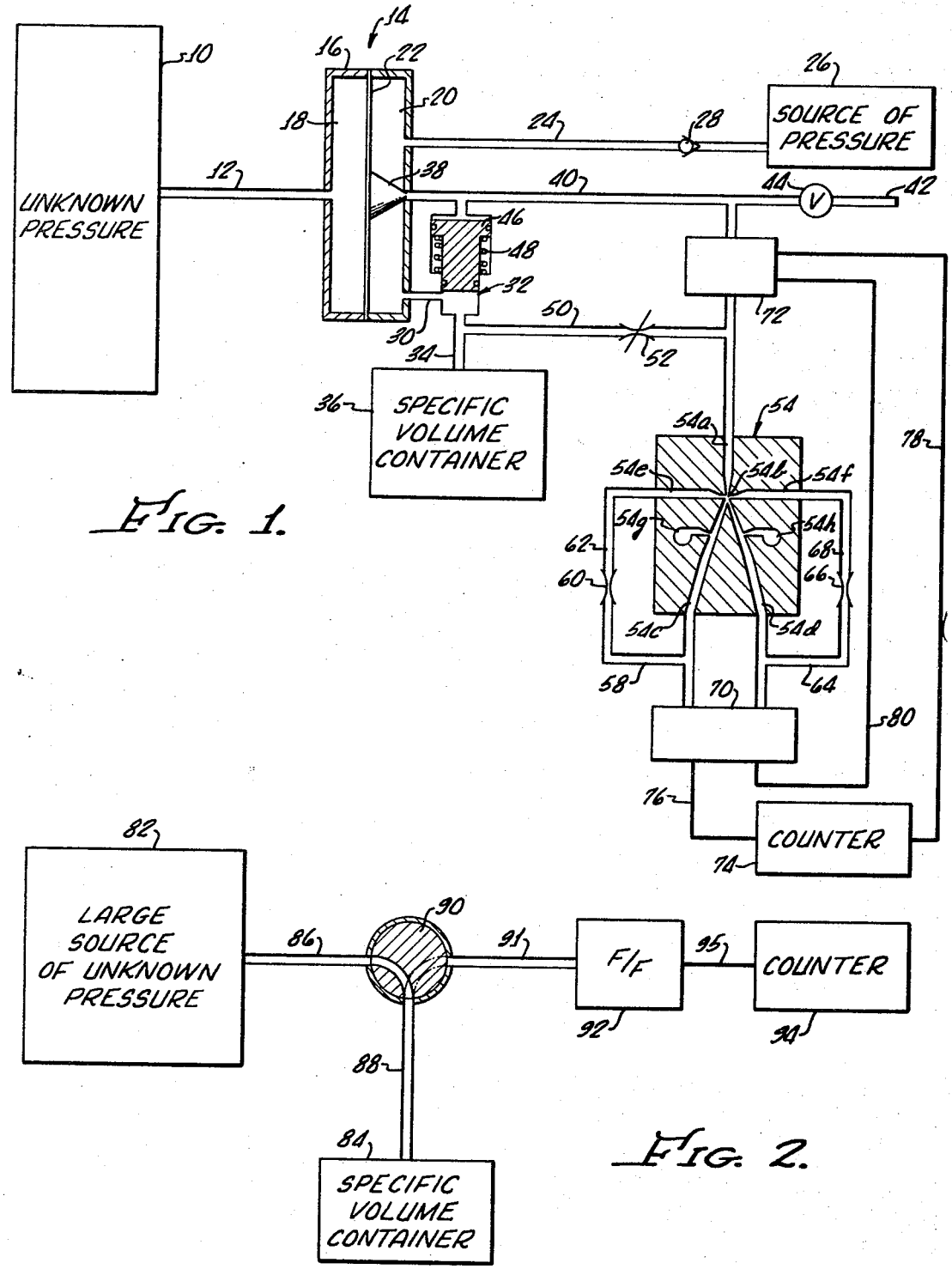

3,717,037
PRESSURE MEASURING SYSTEM
Charles L. Buddecke, Fullerton, Calif., assignor to Charles L. Buddecke, Orris A. Flatten, Oscar E. Hyman, and John Le Valley
Filed Oct. 14, 1971, Ser. No. 189,181
Int. Cl. G01l 7/08
U.S. Cl. 73—388 R                                    11 Claims

ABSTRACT OF THE DISCLOSURE

A container of specific volume is pressurized to the level of an unknown pressure. A diaphragm exposed to the unknown pressure and to the container is utilized to control a valve for making the pressure in the container equal to the unknown pressure. After the container is pressurized to the desired level, it is isolated from its pressurizing source and the fluid in the container is processed through a fluidic bistable oscillator in a manner to produce oscillating mass-flow pulses. These pulses are counted as incremental and accumulating pressure values in suitable registers to provide a digital display of the pressure in the container, and hence the unknown pressure. A pressure operated switch is provided to reset the counters when the container is isolated from its pressurizing source.

---

When the pressure to be determined is from a gas which can be satisfactorily processed through the fluidic oscillator and it is a large source of pressure, the specific volume container can be pressurized directly by the unknown pressure. After this is done, the container is isolated from the unknown pressure and the gas within the container is processed through the fluidic oscillator and the number of oscillations counted to determine the unknown pressure.

This invention relates to an improved method and apparatus for measuring fluid pressure, either hydraulic or gaseous, to provide a digital reading of the pressure.

By definition, pressure times the area acted upon equals the force exerted. The conventional technique for pressure measurement is to convert the pressure into a measured displacement of a resisting force or to measure the restoring force for zero displacement. The force is then measured with any force measuring device. For example this can be done mechanically through spring deflection, weight balance, diaphragm deflection, bellows deflection, etc. It can also be done electrically such as with a strain gauge (resistance), a magnetic device (reactance) or a semi-conductor (electric effect). These are analog measuring systems and the value must be converted through an analog to digital conversion process for recording or translation in the conventional communication process for the users. Thus in the case of the mechanical examples, the movement involved is converted into digital numbers on a dial or similar device; whereas in the electrical examples an analog value of resistance, voltage or current is obtained and then converted through an analog to digital conversion process into an electronic equivalent of a digital value.

The analog system is prone to instabilities, non-linearities, and inconsistent calibration. Further the analog to digital conversion can suffer from the same or second order effects since the process is in part analog itself.

The present invention discloses a unique process and apparatus for measuring an unknown pressure which is independent of an indirect resisting or restoring force, and in the process of measurement converts the analog system into a digital value by a time independent counting procedure.

In a preferred embodiment of the invention which is representative of the technique, the unknown pressure is coupled directly or indirectly through mechanical, hydraulic or pneumatic techniques to a device which equates the pressure into a pneumatic quantity, or ratio thereof, contained in the specific volume. Or in other words, pneumatic pressure is applied to a specific volume container to a pressure level equal to, or at a known ratio to, the unknown pressure. The container is then isolated from its source of pressure and the pneumatic quantity in the container is processed through a fluidic bistable device operating as a tidal volume oscillator by the energy of the pneumatic quantity alone. Such a device oscillates upon the passage of a given mass of fluid through the device and thus produces corresponding oscillating pressure pulses of equal increments. By counting these oscillations and converting them into an increment of pressure change in a preferred system of units, such as pounds per square inch, the accumulated count can then be recorded as a digital gauge pressure. If the unknown pressure to be measured is a large pneumatic source and the fluid is such that it can be processed by the fluidic device, the specific volume container can be pressurized directly from the unknown pressure source. It is then isolated from the source, and the fluid in the container processed through the fluidic oscillator to provide the desired measurement.

For a more thorough understanding of the invention reference may be had to the following detailed description and drawings in which:

FIG. 1 is a diagrammatic view of an embodiment of the invention in which the unknown pressure source is always isolated from the specific volume container; and FIG. 2 is a diagrammatic view of a system wherein the unknown pressure source is used to pressurize the container.

Referring first to FIG. 1 an unknown pressure 10, which in this instance is a fluid pressure either hydraulic or pneumatic, is coupled through a tube 12 to an interface device 14. This device includes a casing 16 divided into two chambers 18 and 20 by a compliant diaphragm 22 which displaces in response to the pressures in the two chambers.

The chamber 20 is connected by tube 24 to a source of pneumatic pressure 26. The requirements of this source are that its pressure be higher than the unknown pressure and that the gas involved be suitable for processing through a fluidic device. Clean dry air is of course very suitable. A check valve 28 allows flow of air from the source to the chamber 20 and prevents flow in the opposite direction.

The chamber 20 is also connected by a tube 30 leading to a shuttle valve 32, a tube 34 and a specific volume container 36. A valve member 38 is mounted on the diaphragm 22 to control flow from the chamber 20 into a tube 40 leading to a vent 42 controlled by a valve 44.

A piston-like valve member 46 slidably mounted in the valve 32 had its upper larger end exposed to pressure in the chamber 22 through the tube 40 and its lower smaller end exposed to the pressure in the tube 30. A spring 48 urges the piston 46 into the upper position shown wherein the tube 30 is in communication with the tube 34 by way of the valve 32. With atmospheric pressure on both ends of the piston 46, the piston will be positioned as shown.

A tube 50 leads from the tube 34 through a variable restrictor 52 into a schematically illustrated bistable, fluidic oscillator or device 54, which is commonly referred to as a flip-flop. The flip-flop 54 includes an inlet port or passage 54a which leads to a common junction 54b connected to a pair of output ports or paths 54c and 54d. The output port 54c is connected by a tube 58 through a restrictor 60 and a tube 62 to a control port 54e, which connects to the common junction 54b. Similarly the output port 54d is connected by a tube 64 through a restrictor 66 to a tube 68 leading to a control port 54f which connects to the junction 54b opposite from the control port 54e. An exhaust port or path 54g is connected to the outlet port 54c. A similar exhaust port or path 54h is connected to the outlet port 54d. The two exhaust ports 54g and 54h vent directly to atmosphere.

The outlet ports 54c and 54d are further connected to a differential pressure operated electrical switch 70, which provides the means for converting pneumatic pressure pulses into electrical signals. The electric signal indicating the change in state of the oscillator 54 is connected by a conductor 80 to a differential pressure operated electrical switch 72 having a pressure responsive means exposed to the pressure of the inlet to the flip-flop 54 and to the pressure in the tube 40. For accumulating the count of the oscillations of the switch 70, there is provided an electronic or electromechanical counter 74 connected by conductor 76 to the switch 70 and further connected by a conductor 78 to the switch 72.

OPERATION

In operation assume that the valve 44 has been opened and then closed so that the tube 40 is at atmospheric pressure. Consequently the diaphragm 22 in the interface device 14 is positioned as shown as a result of the unknown fluid pressure applied to the chamber 18. In this position, the valve member 38 prevents communication between the chamber 20 and the tube 40.

Air is now applied from the source 26 through the check valve 28 and the tube 24 to the chamber 20. The source of pressure 26 can for example simply be a handheld squeeze bulb. Since the chamber 20 is in communication with the specific volume container 36 with the shuttle valve piston 46 positioned as illustrated, continued application of air from the source 26 raises the pressure in the container 36. Air can escape from the system through the tube 50 and the fluidic device 54 since the restrictor 52 is normally partially open. However, the rate of escape is quite small compared to the rate at which the container pressurized.

Once the pressure in the chamber 20 equals or slightly exceeds the pressure in the chamber 18, which of course is equal to the unknown pressure, the valve 38 opens and allows pressure from the source 26 to be also applied to tube 40. The pressure in the tube 40 quickly reaches the level of the pressure chamber 20. This pressure is, of course, applied to the upper end of the shuttle valve piston 46; and since the upper end has an area considerably larger than the lower end, the piston is quickly moved or shuttled downwardly against the urging of its spring 48 to a position wherein the piston 46 blocks communication between the tubes 30 and 34. Thus the specific volume container 36 is isolated from the pressure source 26 and it is at a pressure having a known ratio with respect to that of the unknown pressure 10. Since the areas on opposite sides of the diaphragm are substantially equal, the pressure in the container 36 is substantially equal to the unknown pressure 10.

The air in the container 36 is now processed through the fluidic oscillator 54. The air flowing through the inlet port 54a of the flip-flop 54 will pass to either the output port 54c or 54d. The initial selection will be determined at random as is a characteristic of the fluidic device. Assume for purposes of discussion that the flow initially passes into the output port 54c. A portion of the flow is vented to atmosphere through the exhaust port 54g. Since the exhaust path 54g is restricted in size, a pressure buildup occurs in the outlet port 54c and its connecting passage 58 having the restrictor 60 leading to the control port 54e. At a consistent point, the pressure in the control port 54e becomes sufficient to deflect the fluid flow at the junction 54b to the other side of the passage so that the flow flips over into outlet port 54d. The same thing then happens on that side of the flip-flop with the result that the fluid flow oscillates between the output ports 54c and 54d. These oscillating flows create oscillating pressures between the output ports which are converted to electrical signals by the differential pressure switch 70.

The flip-flop 54 operates as a tidal volume oscillator at low flow rates, such that the flow is laminar in the flip-flop. The device will change state for equal quantities of mass air flow. These quantities are proportional to equal increments of pressure and the device is conveniently calibrated such that one pulse or increment is equivalent to a millimeter of mercury or a pound per square inch of pressure, to indicate differential pressure directly by counting the pulses.

The flip-flop oscillator 54 will continue to operate in this fashion until a minimum operating pressure at the input 54a is reached. This minimum pressure is determined by the pressure drop through the variable restrictor 52 and the decreasing pressure in the container 36. At this minimum pressure, the differential pressure is insufficient to operate the switch 70 and digital value of this minimum pressure is automatically taken into consideration in the setting of the counter 74. The oscillations of the pressure switch 70 are of course counted by the counter 74 to give a direct indication of the number of pressure increments processed by the flip-flop 54.

To obtain an accurate measurement, it is necessary to reset the counter 74 simultaneous with the closing of the valve 32. This is accomplished by the differential pressure switch 72. This switch is in an electrically open position when the pressure at the inlet to the flip-flop is equal to or greater than the pressure in the tube 40. However, when the tube 40 was opened to the pressure in the chamber 20 by way of the valve 38, its pressure became higher than the pressure at the inlet to the flip-flop 54 by virtue of the restrictor 52. Accordingly the switch 72 electrically closed as the container 36 was isolated by the valve 32 from the pressure source 26. The closing of the switch 72 resets or initiates the operation of the counter 74. When the pressure in the container has been reduced to a level such that the flip-flop 54 stops operation, the counter 74 will indicate the unknown pressure 10.

When a new measurement is to be made it is only necessary to open the valve 44, allowing the tube 40 to vent to atmosphere and then close the valve. This will cause the switch 72 to open causing the counter 74 to reset. Also the venting of the tube 40 will permit the shuttle valve member 46 to move to its upper position as shown in FIG. 1 in response to the urging of the spring 48, thus placing the chamber 20 once more in communication with the container 36. A new measurement can then be made.

EMBODIMENT OF FIG. 2

In the arrangement of FIG. 2 an unknown pressure source 82 is shown connected to a specific volume container 84 by way of tubes 86 and 88 and a valve 90, with the valve in the solid line position as shown in FIG. 2. With the valve moved to the dotted line position, the specific volume container 84 is connected by the tubes 88 and a tube 91 to a fluidic flip-flop device 92 identical to that of the device 54 shown in FIG. 1. The flip-flop 92 includes a pressure to an electric switch, not shown, which is comparable to the switch 70 in FIG. 1, and the electric output of the switch is connected to a counter 94 by a conductor 95.

The unknown pressure in this instance is a gas which can be safely processed through the flip-flop 92. A source of clean dry air would be a common example, but other gas sources may be employed. The other requirement is that the source is sufficiently large such that using a small portion of it to pressurize the container 84 will not significantly reduce the unknown pressure 82.

Based on the description of FIG. 1, it will be apparent that in operation the valve 90 in FIG. 2 is first moved to the solid line position so that the container is pressurized to the level of the unknown pressure. The valve 90 is then moved to the dotted line position so that the container 84 is isolated from the unknown pressure 82 and the fluid in the container 84 is allowed to be processed through the flip-flop 92. As the counter 94 counts the equal oscillating pressure increments produced by the flip-flop 92, a digital count of the pressure in the container 84 and hence the unknown pressure 82 is obtained.

An analysis of the operation of the tidal flow oscillators 54 and 92 is given below to show that the electrical count of the change of state of the oscillator is equivalent to a specific change in pressure; hence an accumulated count between an unknown pressure and a reference pressure is a measure of the unknown pressure. As stated the fluidic oscillator operates as a tidal volume oscillator such that the output state changes ($\Delta$ state) for each increment of mass flow ($\Delta$ mass). When the mass source is a specific and constant volume of working fluids under initial pressure, the discharge of the quantity (Q) through the oscillator is expressed as $Q=dm/dt$. At the same time, the pressure drop in the isolated and fixed volume is linear with mass flow: $dm/dt=\text{volume}.dp/dt$. Hence $\Delta m=\text{volume}.\Delta p$. It is now evident that $$\Delta\text{state}=\Delta m=\text{volume}.\Delta p$$

and since the volume is constant $\Delta\text{state}/\Delta p=\text{a constant}$.

Fluidic oscillators of this general type are well known. One suitable device is made by Corning Fluid Products, a department of Corning Glass Works of Corning, N.Y. Also, while the device as illustrated in FIG. 1 does not include the fluid restrictors 60 and 66 nor the tubes connecting these restrictors to the oscillator 54, it should be understood that these components can be incorporated into a single fluidic device with the input simply connected to the fixed volume container and the output connected to the pressure switch.

What is claimed is:

1. A method of measuring an unknown pressure comprising the steps of:
   applying pneumatic pressure to a specific volume container to a pressure level equal to or at a known ratio to that of the unknown pressure;
   isolating the container from its source of pressure;
   processing the fluid from the container through a fluidic device of the type which will cause the fluid flow to oscillate between alternate restricted exhaust paths, each oscillation occurring upon the passage of a given mass of fluid through the device, the oscillating of the fluid flow producing corresponding, oscillating pressure pulses of equal increments; and
   counting the pressure increments to obtain a digital reading of the pressure in the container and thereby the unknown pressure.

2. The method of claim 1 wherein the pressure applied to the container is taken from a source other than said unknown pressure and the container is permanently isolated from the unknown pressure.

3. The method of claim 2 wherein the pressure applied to the container is used to isolate the container from its source after the container has reached said pressure level.

4. The method of claim 1 wherein the unknown pressure is pneumatic and the volume of the unknown pressure source is very large relative to the volume of the container and the pressure applied to the container is from the unknown pressure source.

5. Apparatus for measuring an unknown pressure comprising:
   a specific volume container be pressurized to a level equal to, or at a known ratio to the unknown pressure;
   means to isolate the container from the unknown pressure;
   fluidic means connected to process fluid from the container in a manner to produce pressure pulses of substantially equal pressure increments; and
   means for counting the pressure increments to obtain a digital measure of the pressure in the container and hence the unknown pressure.

6. The apparatus of claim 5 wherein said fluidic means includes a bistable fluidic flip-flop having an inlet port connected to the container, a pair of output ports stemming from a common junction leading from the inlet port, a pair of restricted exhaust paths leading from the output port, a pair of control ports on opposite sides of said junction for deflecting fluid flow to one or the other output port, and a pair of flow restrictors each connecting an output port to one of the control ports to produce said pressures increments.

7. The apparatus of claim 5 including an interface device having two chambers separated by a flexible diaphragm, with one of the chambers being exposed to the unknown pressure and the other chamber being exposed to a source of pressure at least as large as the unknown pressure, said other chamber being in communication with the specific volume container, a valve member controlled by said diaphragm in a manner to maintain the pressure in said other chamber substantially equal or at a known ratio to the pressure in the chamber exposed to the unknown pressure; and
   valve means for isolating said container from its source of pressure when the pressure in said chambers are equal with the result that the pressure in the container is substantially equal to the unknown pressure.

8. The apparatus of claim 7 wherein said valve means is adapted to close when exposed to pressure in said other chamber as transmitted past the valve member mounted on said diaphragm so that the specific volume container is automatically isolated when it reaches the level equal to or at a known ratio to the unknown pressure.

9. The apparatus of claim 5 wherein said means for counting the oscillations of said fluidic oscillator include a pressure to electric switch subject to the oscillating pressures, and a counter receiving the output of said electric switch.

10. The apparatus of claim 9 including switch means connected to said oscillator switch and said counter to initiate operation of the counter as the container is isolated from its pressurizing source.

11. Apparatus for measuring an unknown fluid pressure comprising:
   a specific volume container;
   an interface device having two chambers separated by a flexible diaphragm, with one of the chambers being exposed to the unknown pressure and the other chamber connected to the container;
   means connected to said other chamber for pressurizing the chamber and hence the container to a level at leas as high as the unknown pressure;
   an outlet tube leading from said chamber, and means for releasing pressure from the tube;
   a valve member moved by said diaphragm to control fluid flow from said other chamber into said outlet tube, the valve member being arranged such that flow into the outlet tube is prevented until the pressure in said other chamber is substantially equal to the pressure in the chamber exposed to the unknown pressure;
   valve means for controlling flow from said other chamber to said container, said valve means being responsive to the pressure in said container and the pressure in said outlet tube, said valve means being adapted to permit flow into the container when the pressure in the outlet tube is less than that in the container and to close when the pressure in the outlet tube equals that in the container so that the container is automatically isolated when it reaches a pressure equal to the unknown pressure;

fluidic means connected to process fluid from the container in a manner to produce pressure pulses of substantially equal increments;

a pressure responsive electrical switch subjected to the oscillating pressures of said fluidic means to produce a signal for each pressure increment;

means for counting the signals to obtain a digital measure of the pressure in the container; and a second pressure responsive electrical switch responsive to the differential pressure of said outlet tube and the pressure at the entrance to the fluidic means, said second switch being connected to said oscillator switch and said counting means and being adapted to operate with the isolating of the container so that tha counting means accumulates the count as the container is isolated from said other chamber.

References Cited
UNITED STATES PATENTS 3,373,600  3/1968  Taplin ---------------- 73—32

DONALD O. WOODIEL, Primary Examiner

U.S. Cl. X.R.

73—406